UNITED STATES PATENT OFFICE.

DAVID A. WALKER, JR., OF CHARLESTON, SOUTH CAROLINA.

METHOD OF PRESERVING CITROUS FRUITS.

SPECIFICATION forming part of Letters Patent No. 524,008, dated August 7, 1894.

Application filed March 28, 1894. Serial No. 505,378. (No specimens.)

*To all whom it may concern:*

Be it known that I, DAVID A. WALKER, Jr., a citizen of the United States, residing in the city and county of Charleston, in the State of South Carolina, have invented a new and useful Method of Preserving Citrous Fruits in their Natural State, of which the following is a specification.

This method of preserving citrous fruits consists in coating the exterior surface of such fruit with a paste composed of flour, starch and water in the proportion of one part of starch, two parts of flour and six parts of water. The ingredients forming this paste are to be thoroughly mixed in any convenient manner or vessel. The paste may be applied for instance by means of a brush or in any suitable manner, precaution being taken to throw out all unsound fruit and to free that which is to be used from adhering impurities. After the fruit is thus coated it is allowed to dry.

By the use of the above composition the fruit will be preserved in a perfectly natural state for sixty days or more, retaining all its juiciness, flavor and healthful substance so that it may be transported to distant markets with safety.

I am aware that pastes containing starch are not new and I am also aware that pastes have been applied as exterior coatings for meats, such as hams.

What I claim, and desire to secure by Letters Patent of the United States, is—

The herein described method of preserving citrous fruits which consists in coating the fruits with a paste composed of starch, flour and water in the proportions set forth and then drying the coating, substantially as described.

DAVID A. WALKER, JR.

Witnesses:
WM. M. THOMAS,
JOS. G. BRUNSWICK.